United States Patent
Tu et al.

(10) Patent No.: US 7,522,094 B1
(45) Date of Patent: Apr. 21, 2009

(54) METHOD AND SYSTEM FOR RADAR TRACKING OF MOVING TARGET FROM MOVING STATION

(75) Inventors: Po-Jen Tu, Taipei (TW); Jean-Fu Kiang, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 11/986,531

(22) Filed: Nov. 20, 2007

(30) Foreign Application Priority Data

Oct. 9, 2007 (TW) .............................. 96137781 A

(51) Int. Cl.
*G01S 13/72* (2006.01)

(52) U.S. Cl. .............................. 342/95; 342/96; 342/97; 342/106; 342/107; 342/140; 342/142; 342/179; 342/180; 342/195; 342/451; 701/207; 701/223

(58) Field of Classification Search .................. 342/59, 342/62, 63, 90, 94–97, 106–108, 113–115, 342/126, 133, 139–142, 146, 147, 159–162, 342/179–180, 195, 451, 463; 701/207, 223
See application file for complete search history.

(56) References Cited

U.S. PATENT DOCUMENTS

| | | | | |
|---|---|---|---|---|
| 3,659,085 A | * | 4/1972 | Potter et al. ................. | 701/207 |
| 3,795,911 A | * | 3/1974 | Hammack .................... | 342/106 |
| 3,996,590 A | * | 12/1976 | Hammack .................... | 342/465 |
| 5,138,322 A | * | 8/1992 | Nuttall ........................ | 342/126 |
| 6,922,632 B2 | * | 7/2005 | Foxlin ......................... | 701/207 |
| 2004/0119633 A1 | * | 6/2004 | Oswald et al. ................ | 342/70 |
| 2005/0077424 A1 | * | 4/2005 | Schneider ................... | 244/3.11 |
| 2008/0004798 A1 | * | 1/2008 | Troxler et al. ............... | 701/207 |

FOREIGN PATENT DOCUMENTS

JP           61205883 A   *   9/1986

\* cited by examiner

*Primary Examiner*—John B Sotomayor
(74) *Attorney, Agent, or Firm*—Peter F. Corless; Steven M. Jensen; Edwards Angell Palmer & Dodge LLP

(57) ABSTRACT

A method and system is proposed for use by a moving station (such as a jetfighter) for radar tracking of a moving target (such as an air-to-air missile). The proposed method and system involves the use of a hybrid FSK/LFM (Frequency Shift Keying & Linear Frequency Modulation) scheme for acquiring a collection of raw radar data, a first Gaussian-noise filter array of one-stage linear Kalman filters for S/N-enhancement of the raw radar data, a trilateration module, and a second Gaussian-noise filter array of one-stage linear Kalman filters for S/N-enhancement of the trilateration-resulted radar data. These features allow the radar tracking of moving objects to be more fast and accurate.

12 Claims, 3 Drawing Sheets

METHOD AND SYSTEM FOR RADAR TRACKING OF MOVING TARGET FROM MOVING STATION

BACKGROUND OF THE INVENTION

1. Field of the Invention

This invention relates to radar technology, and more particularly, to a method and system for radar tracking of a moving target (such as an air-to-air missile) from a moving station (such as a jetfighter) with improved accuracy and performance.

2. Description of Related Art

A radar system is a radio-based surveillance system that uses electromagnetic waves to identify the range, altitude, direction, or speed of moving or fixed objects such as aircraft, ships, and motor vehicles. In operation, a radar system is capable of emitting a beam of radio wave toward the area under surveillance, and if a target exists in that area, the emitted radio wave will be reflected back. The reflected radio wave is then received by the radar system and analyzed to determine the position, speed, and acceleration of the target.

Radar systems are categorized into ground-based type and airborne type. The airborne-type radar systems are installed on airplanes such as jetfighters for detecting air-to-air missiles or nearby airplanes. In this type of application, since the radar system and the target are both moving, the detected radar data represents the relative position, relative speed, and relative acceleration of the target.

Many research efforts have been conducted on airborne radar systems intended for air-to-air missile detections. For example, the technical paper "WAVEFORM DESIGN PRINCIPLES FOR AUTOMOTIVE RADAR SYSTEMS" authored by H. Rohling and M. M. Meinecke, IEEE Radar, pp. 1-4. October 2001, proposes a radar system that utilizes a hybrid FSK/LFM (Frequency Shift Keying & Linear Frequency Modulation) technique for detection of relative distance and relative speed between the radar system and the target.

One drawback to the aforementioned radar system, however, is that the hybrid FSK/LFM sensor is only capable of detecting the range and speed of the target, and incapable of detecting the acceleration.

Moreover, many conventional radar systems utilize trilateration to obtain the range, velocity, and acceleration of the target from a collection of raw radar data. One drawback to the trilateration process, however, is that it would undesirably degrade the S/N (signal-to-nose ratio) of the original radar data.

SUMMARY OF THE INVENTION

It is therefore an objective of this invention to provide a new radar method and system that utilizes a new and modified FSK/LFM technique capable of detecting the acceleration of the target in addition to the target's range and speed.

It is another objective of this invention to provide a new radar method and system that can provide enhanced S/N ratio of the detected data for improved accuracy of target tracking.

Defined as a method, the invention comprises: (M1) emitting a radar signal beam; (M2) sensing an echo of the radar signal beam from a moving target and producing a raw set of radar data about the moving target, including range, velocity, and acceleration; (M3) performing S/N (signal-to-noise ratio) enhancement of each raw set of radar data; (M4) performing trilateration on the S/N-enhanced sets of radar data in reference to a predefined 3-dimensional coordinate system having a first axis, a second axis, and a third axis to obtain three axis-oriented sets of radar data respectively in reference to the first axis, the second axis, and the third axis of the 3-dimensional coordinate system; (M5) performing S/N enhancement on the trilateration-resulted sets of radar data; and (M6) a radar data presentation module, which is capable of presenting the S/N-enhanced sets of radar data produced by the second Gaussian-noise filter array in a human-cognizable data form.

The moving object radar tracking system according to the invention comprises: (A) a radar signal emitter; (B) a radar signal sensor array including an array of N radar signal sensors that are preferably each implemented with a hybrid FSK/LFM sensors; (C) a first Gaussian-noise filter array including an array of N Gaussian-noise filters that are preferably implemented with one-stage linear Kalman filters; (D) a trilateration module; (E) a second Gaussian-noise filter array, which includes at least 3 Gaussian-noise filters that are preferably implemented with an array of one-stage linear Kalman filters; and (F) a radar data presentation module.

The method and system for tracking moving target from moving station according to the invention is characterized by the use of a hybrid FSK/LFM (Frequency Shift Keying & Linear Frequency Modulation) scheme for acquiring a collection of raw radar data, a first Gaussian-noise filter array of one-stage linear Kalman filters for S/N-enhancement of the raw radar data, a trilateration module, and a second Gaussian-noise filter array of one-stage linear Kalman filters for S/N-enhancement of the trilateration-resulted radar data. These features allow the radar tracking of moving objects to be more fast and accurate.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The moving target radar tracking system of the invention according to the invention is disclosed in full details by way of preferred embodiments in the following with reference to the accompanying drawings.

Application of the Invention

Figure 1:
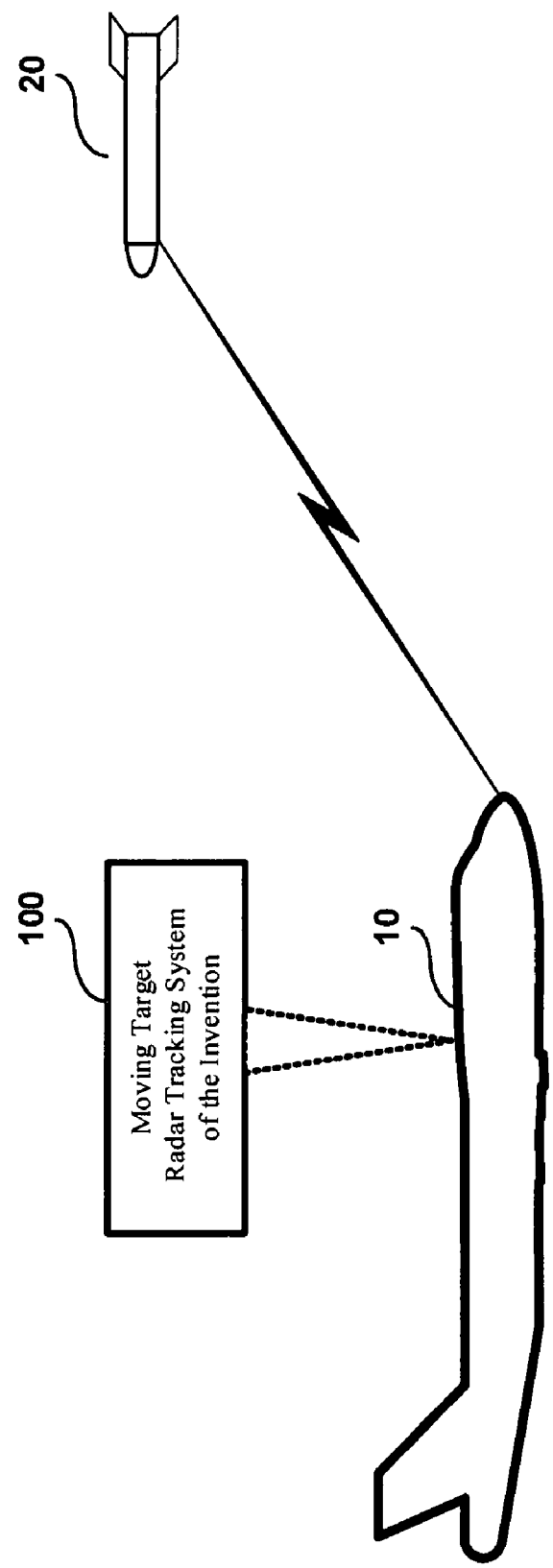
FIG. 1 is a schematic diagram showing the application of the moving target radar tracking system according to the invention.

FIG. 1 is a schematic diagram showing an application example of the moving target radar tracking system according to the invention (which is here encapsulated in a box indicated by the reference numeral 100). As shown, the moving target radar tracking system of the invention 100 is designed for installation on a moving station, such as a jetfighter 10, for the jetfighter 10 to detect the position and motion of a moving target, such as an air-to-air missile (AAM) 20 that is in constant changes of position and motion relative to the jetfighter 10. During operation, when the AAM 20 is in proximity to the jetfighter 10, the moving object radar tracking system of the invention 100 will respond to this condition by indicating the position, speed, and acceleration of the AAM 20 to the pilot of the moving target radar tracking system of the invention 100.

Architecture of the Invention

Figure 2:
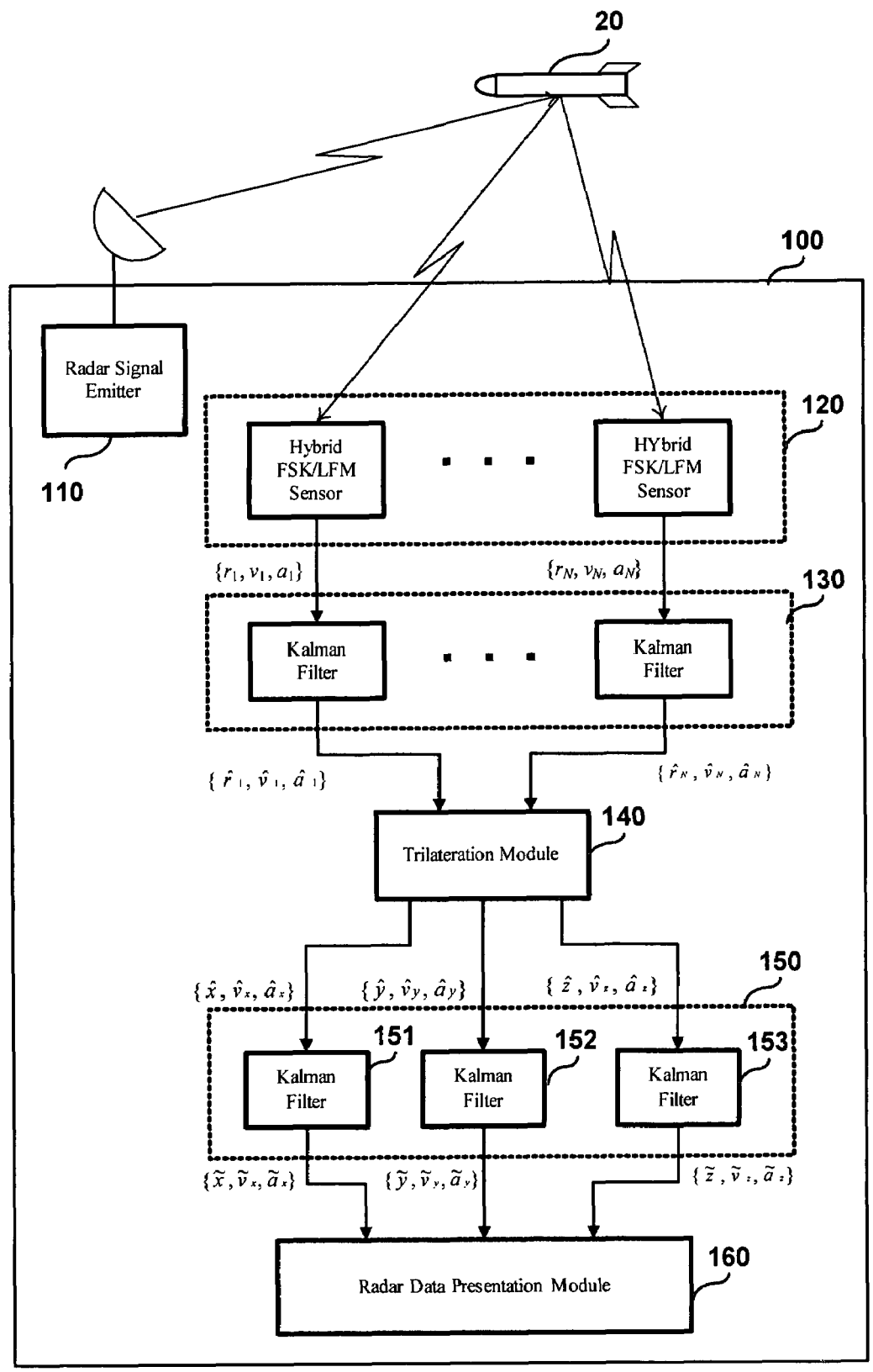
FIG. 2 is a schematic diagram showing the internal architecture of the moving target radar tracking system according to the invention.

As shown in FIG. 2, in architecture, the moving target radar tracking system of the invention 100 comprises: (A) a radar signal emitter 110; (B) a radar signal sensor array 120, which includes an array of N radar signal sensors that are preferably each implemented with a hybrid FSK/LFM sensors; (C) a first Gaussian-noise filter array 130, which includes N Gaussian-noise filters that are preferably each implemented with a one-stage linear Kalman filter; (D) a trilateration module 140; (E) a second Gaussian-noise filter array 150, which includes at least 3 Gaussian-noise filters 151, 152, 153, that are preferably implemented with an array of one-stage linear Kalman filters; and (F) a radar data presentation module 160. The respective functions of the constituent components of the moving target radar tracking system of the invention 100 are described in details in the following.

Radar Signal Emitter 110

The radar signal emitter 10 is used for emitting a beam of radar signal into the space under surveillance by the jetfighter 10. If an AAM 20 is in the proximity of the jetfighter 10, the radar signal beam will hit the AAM 20 and reflect as an echoed radar signal back to the jetfighter 10.

Radar Signal Sensor Array 120

The radar signal sensor array 120 includes an array of N radar signal sensors that are preferably implemented with a plurality of hybrid FSK/LFM sensors, each of which is based on a combination of the FSK (Frequency Shift Keying) and the LFM (Linear Frequency Modulation) techniques for extracting a set of position-motion data about the AAM 20, including the range, radial velocity, and radial acceleration of the AAM 20 based on the echoed radar signal. The number N can be 2, 3, or more. The N hybrid FSK/LFM sensors in the radar signal sensor array 120 are respectively used for the sampling of a raw set of position-motion data, represented by $\{r_1, v_1, a_1\}$, $\{r_2, v_2, a_2\}$, . . . , and $\{r_N, v_N, a_N\}$, respectively. Compared to the conventional FSK/LFM technique proposed by H. Rohling and M. M. Meinecke in the technical paper "WAVEFORM DESIGN PRINCIPLES FOR AUTOMOTIVE RADAR SYSTEMS", it is an important aspect of the invention that the hybrid FSK/LFM sensors in the radar signal sensor array 120 is capable of additionally acquiring the acceleration of the AAM 20, rather than just the range and velocity of the AAM 20 by this prior art. Each hybrid FSK/LFM sensor in the radar signal sensor array 120 is designed to compute for the range $r_1$ radial velocity v, and radial acceleration a of the AAM 20 based on a modified FSK/LFM technique as described below.

Figure 3A:
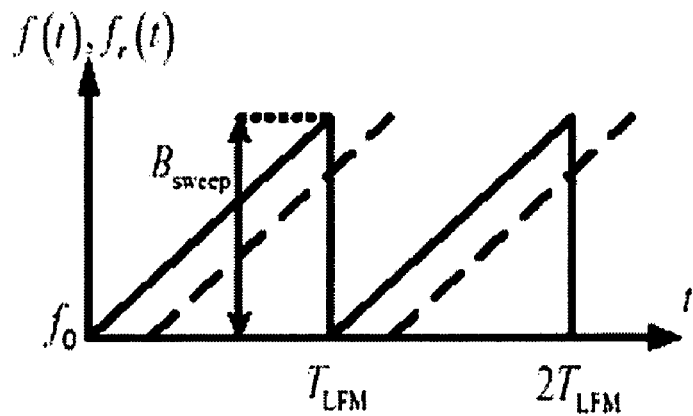
FIG. 3A is a graph showing the characteristic plot of frequency variation of an LFM signal using a conventional FSK/LFM technique.
Figure 3B:
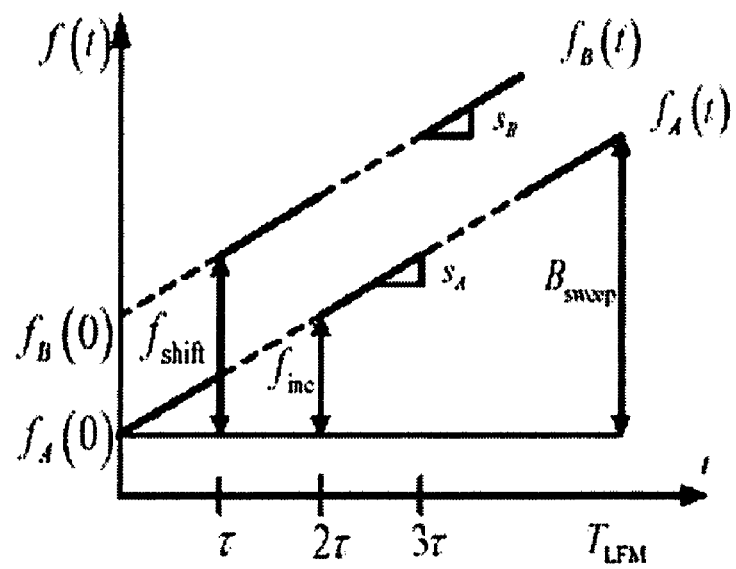
FIG. 3B is a graph showing the characteristic plot of frequency variation of a pair of LFM signals using a modified FSK/LFM technique in accordance with the invention.

FIG. 3A a graph showing the characteristic plot of the frequency variation of an LFM signal using the conventional FSK/LFM technique (in this graph, $B_{sweep}$ represents bandwidth and $T_{LFM}$ represents dwell time); whereas FIG. 3B is a graph showing the characteristic plot of the frequency variation of a pair of LFM signals utilized by the invention. The two LFM signals respectively have a positive slope of $S_A$ and $S_B$. If 2N samples are to be acquired during an internal of $\tau=T_{LFM}/2N$, then the frequency increment over $2\tau$ is $f_{inc}=B_{sweep}/N$. In one typical application of the invention, for example, the parameters $B_{sweep}$, $f_A(t)$, $f_B(t)$, $T_{LFM}$, and N are respectively $B_{sweep}=150$ MHz, $f_B(t)-f_A(t)=300$ kHz, $T_{LFM}=256$ ms, and N=256. The shift in the frequency of the second LFM signal measured at the temporal point $t=2n\cdot\tau$ from the frequency of the first LFM signal measured at the temporal point $t=(2n-1)\cdot\tau$ is represented by $f_{shift}$, and $f_{shift}=f_B(0)-f_A(0)+S\cdot\tau$, where $S=S_A$ for the first LFM signal and $S=S_A$ for the first LFM signal. Further, the difference between the frequency of the echoed radar signal and the frequency of the originally-emitted radar signal beam is $\Delta f_A=f_{rA}(t)-f_A(t)$ for the first LFM signal, and $\Delta f_B=f_{rB}(t)-f_B(t)$ for the second LFM signal. If we define $S_A=\Delta f_A \cdot T_{LFM}$ and $S_B=\Delta f_B \cdot T_{LFM}$, then during the time interval $0<t<T_{LFM}$, it can be deduced that:

$$S_A = T_{LFM}[f_{rA}(t) - f_A(t)]$$
$$= T_{LFM}\left\{\left[f_0 + s\left(t - \frac{2r_A}{c}\right)\right]\left(1 - \frac{2v_A}{c}\right) - (f_0 + st)\right\}$$
$$= T_{LFM}\left[-\frac{2v_A}{c}f_A(t) - \frac{2sr_A}{c}\left(1 - \frac{2v_A}{c}\right)\right]$$
$$\simeq T_{LFM}\left[-\frac{2s}{c}r_A - \frac{2f_A(t)}{c}v_A\right]$$

$$S_B = T_{LFM}[f_{rB}(t) - f_B(t)]$$
$$\simeq T_{LFM}\left[-\frac{2sr_B}{c} - \frac{2v_B}{c}f_B(t)\right]$$
$$= T_{LFM}\left[-\frac{2s}{c}(r_A + v_A\tau + a\tau^2/2) - \frac{2}{c}(v_A + a\tau)f_B(t)\right]$$
$$= T_{LFM}\left\{\frac{-2s}{c}r_A - \frac{2}{c}[f_B(t) + s\tau]v_A - \frac{2}{c}\left[\tau f_B(t) + \frac{s\tau^2}{2}\right]a\right\}$$

where $\tau_A$, $v_A$ are respectively the range and velocity of the AAM 20 at $t=(2n-1)\cdot\tau$;

$\tau_B$, $v_B$ are respectively the range and velocity of the AAM 20 at $t=2n\cdot\tau$.

Further, the phase difference $\Delta\phi$ between the second LFM signal measured at $t=2n\cdot\tau$ and the first LFM signal measured at $t=(2n-1)\cdot\tau$ can be obtained from the following equation:

$$\Delta\varphi = \varphi_B - \varphi_A =$$
$$\frac{4\pi}{c}\left\{\left[f_B(0) + 2ns\tau - \frac{2sr_B}{c}\right]\left(1 - \frac{2v_B}{c}\right)r_B - \left[f_A(0) + (2n-1)s\tau - \frac{2sr_A}{c}\right]\left(1 - \frac{2v_A}{c}\right)r_A\right\} \simeq$$
$$\frac{4\pi}{c}\left\{\left[f_B(0) + 2ns\tau - \frac{2sr_B}{c}\right]r_B - \left[f_A(0)+(2n-1)s\tau - \frac{2sr_A}{c}\right]r_A\right\} \simeq$$
$$\frac{4\pi}{c}f_{shift}\tau_A + \frac{4\pi}{c}f_B(t)\left(v_A\tau + \frac{1}{2}a\tau^2\right)$$

Therefore, it can be deduced that:

$$\begin{bmatrix} r \\ v \\ a \end{bmatrix} = \begin{bmatrix} r_A \\ v_A \\ a \end{bmatrix} = \overline{J}^{-1} \cdot \begin{bmatrix} -S_A C/T_{LFM} \\ -S_B C/T_{LFM} \\ \Delta\varphi C/\pi \end{bmatrix}$$

where $$\overline{J} = \begin{bmatrix} 2s & 2f_A(t) & 0 \\ 2s & 2[f_B(t)+s\cdot\tau] & 2[f_B(t)\cdot\tau + s\cdot\tau^2/2] \\ 4f_{shift} & 4f_B(t)\cdot\tau & 2f_B(t)\cdot\tau^2 \end{bmatrix}$$

Moreover, if we choose $f_{shift}=f_{inc}/2$, a higher level of accuracy can be achieved for the range and velocity measurement. The output N datasets $\{r_1, v_1, a_1\}$, $\{r_2, v_2, a_2\}$, ..., and $\{r_N, v_N, a_N\}$ from this radar signal sensor array 120 are then transferred respectively to the N Gaussian-noise filters in the first Gaussian-noise filter array 130 for S/N enhancement.

First Gaussian-Noise Filter Array 130

The first Gaussian-noise filter array 130 includes N Gaussian-noise filters which are preferably implemented with an array of N one-stage linear Kalman filters, each being coupled to one of the N hybrid FSK/LFM sensors in the radar signal sensor array 120. These N one-stage linear Kalman filters are capable of reducing the Gaussian-noise in the output datasets $\{r_1, v_1, a_1\}$, $\{r_2, v_2, a_2\}$, ..., and $\{r_N, v_N, a_N\}$ from the N hybrid FSK/LFM sensors in the radar signal sensor array 120. These N one-stage linear Kalman filters are based on a conventional Gaussian-noise filtering technology, so detailed description thereof will not be given in this specification. References about the internal structure and input-output characteristics of the one-stage linear Kalman filtering method can be found, for example, in the book "*Adaptive Filter Theory*", fourth edition, authored by S. Haykin and published by Prentice Hall, 2002; and the technical paper entitled "RADAR TRACKING FOR AIR SUREILLANCE IN A STRESSFUL ENVIRONMENT USING A FUZZY-GAIN FILTER" by K. C. C. Chan et al, IEEE Trans. Fuzzy Syst. vol. 5, no. 1, pp. 80-89, June 1997. The None-stage linear Kalman filters in the first Gaussian-noise filter array 130 are used in combination to produce a collection of N S/N-enhanced sets of position-motion data about the AAM 20, which are represented by $\{\hat{r}_1, \hat{v}_1, \hat{a}_1\}$, $\{\hat{r}_2, \hat{v}_2, \hat{a}_2\}$, ..., and $\{\hat{r}_N, \hat{v}_N, \hat{a}_N\}$, respectively. These S/N-enhanced datasets $\{\hat{r}_1, \hat{v}_1, \hat{a}_1\}$, $\{\hat{r}_2, \hat{v}_2, \hat{a}_2\}$, ..., and $\{\hat{r}_N, \hat{v}_N, \hat{a}_N\}$ are then transferred to the trilateration module 140 for further processing.

Trilateration Module 140

The trilateration module 140 is used for processing the N S/N-enhanced datasets $\{\hat{r}_1, \hat{v}_1, \hat{a}_1\}$, $\{\hat{r}_2, \hat{v}_2, \hat{a}_2\}$, ..., $\{\hat{r}_2, \hat{v}_2, \hat{a}_2\}$ from the first Gaussian-noise filter array 130 in reference to a predefined 3-dimensional (3-D) coordinate system, preferably a 3-D rectangular coordinate system having an x-axis, a y-axis, and a z-axis, to thereby obtain a collection of 3 axis-oriented sets of position-motion data respectively in reference to the x-axis, the y-axis, and the z-axis of the 3-D rectangular coordinate system. The trilateration process yields a set of position data $\{\hat{x}, \hat{y}, \hat{z}\}$, a set of velocity data $\{\hat{v}_x, \hat{v}_y, \hat{v}_z\}$, and a set of acceleration data $\{\hat{a}_x, \hat{a}_y, \hat{a}_z\}$ in accordance with the following equations (A1), (A2), and (A3):

Equation (A1):

$$\hat{x} = \frac{x_1^2 - x_2^2 - \hat{r}_1^2 + \hat{r}_2^2}{2\cdot(x_1-x_2)}$$

$$\hat{y} = \frac{-p_2 + \sqrt{p_2^2 - 4p_1 p_3}}{2p_1}$$

$$\hat{z} = p_4 \frac{y_3}{z_3} \cdot \hat{y}$$

Equation (A2):

$$\begin{bmatrix} \hat{v}_x \\ \hat{v}_y \\ \hat{v}_z \end{bmatrix} = \overline{L}^{-1} \cdot \begin{bmatrix} \hat{v}_1 \cdot \hat{r}_1 \\ \hat{v}_2 \cdot \hat{r}_2 \\ \hat{v}_3 \cdot \hat{r}_3 \end{bmatrix} \text{ where } \overline{L} = \begin{bmatrix} \hat{x} - x_1 & \hat{y} & \hat{z} \\ \hat{x} - x_2 & \hat{y} & \hat{z} \\ \hat{x} & \hat{y} - y_3 & \hat{z} - z_3 \end{bmatrix}$$

Equation (A3):

$$\begin{bmatrix} \hat{a}_x \\ \hat{a}_y \\ \hat{a}_z \end{bmatrix} = \overline{L}^{-1} \cdot \begin{bmatrix} \hat{a}_1 \cdot \hat{r}_1 \\ \hat{a}_2 \cdot \hat{r}_2 \\ \hat{a}_3 \cdot \hat{r}_3 \end{bmatrix}$$

The above-listed equations (A1), (A2), and (A3) are deduced as follows. Assume that the location of the (i)th hybrid FSK/LFM sensor in the radar signal sensor array 120 is $(x_i, y_i, z_i)$, the originally-emitted radar signal beam hits the AAM 20 and reflects back at $(\hat{x}, \hat{y}, \hat{z})$ (which represented the detected position of the AAM 20), and the AAM 20 moves at a velocity of $\{\hat{v}_x, \hat{v}_y, \hat{v}_z\}$. Then, in the case of N=3, the 3 hybrid FSK/LFM sensors in the radar signal sensor array 120 can be used to respectively acquire three samples of range data $\{\hat{r}_1, \hat{r}_2, \hat{r}_3\}$, which are mathematically expressed as follows:

$$\hat{r}_1^2 = (\hat{x}-x_1)^2 + \hat{y}^2 + \hat{z}^2 \quad (1)$$

$$\hat{r}_2^2 = (\hat{x}-x_2)^2 + \hat{y}^2 + \hat{z}^2 \quad (2)$$

$$\hat{r}_3^2 = \hat{x}^2 + (\hat{y}-y_3)^2 + (\hat{z}-z_3)^2 \quad (3)$$

Note that $y_1 = z_1 = y_2 = z_2 = x_3 = 0$. From (1) and (2), it can be deduced that:

$$\hat{r}_1^2 - (\hat{x}-x_1)^2 = \hat{r}^2 - (\hat{x}-x_2)^2$$

Therefore, it can be deduced that:

$$\hat{x} = \frac{x_1^2 - x_2^2 - \hat{r}_1^2 + \hat{r}_2^2}{2\cdot(x_1-x_2)}$$

$$\hat{y} = \frac{-p_2 + \sqrt{p_2^2 - 4p_1 p_3}}{2p_1}$$

$$\hat{z} = p_4 \frac{y_3}{z_3} \cdot \hat{y}$$

where $$p_1 = 1 + \frac{y_3^2}{z_3^2}$$

$$p_2 = -2p_4 \cdot \frac{y_3}{z_3}$$

$$p_3 = p_4^2 - \hat{r}_2^2 + (\hat{x} - x_2)^2$$

$$p_4 = \frac{\hat{r}_2^2 - (\hat{x} - x_2)^2 - \hat{r}_3^2 + \hat{x}^2 + y_3^2 + z_3^2}{2z_3}$$

Further, it can be deduced that $\{\hat{v}_1, \hat{v}_2, \hat{v}_3\}$ is mathematically related to $\{\hat{v}_x, \hat{v}_y, \hat{v}_z\}$ as follows:

$$\hat{v}_1 = \frac{\hat{x} - x_1}{\hat{r}_1} \cdot \hat{v}_x + \frac{\hat{y}}{\hat{r}_1} \cdot \hat{v}_y + \frac{\hat{z}}{\hat{r}_1} \cdot \hat{v}_z$$

$$\hat{v}_2 = \frac{\hat{x} - x_2}{\hat{r}_2} \cdot \hat{v}_x + \frac{\hat{y}}{\hat{r}_2} \cdot \hat{v}_y + \frac{\hat{z}}{\hat{r}_2} \cdot \hat{v}_z$$

$$\hat{v}_3 = \frac{\hat{x}}{\hat{r}_3} \cdot \hat{v}_x + \frac{\hat{y} - y_3}{\hat{r}_2} \cdot \hat{v}_y + \frac{\hat{z} - z_3}{\hat{r}_2} \cdot \hat{v}_z$$

From the above equations, it can be obtained that:

$$\begin{bmatrix} \hat{v}_x \\ \hat{v}_y \\ \hat{v}_z \end{bmatrix} = \overline{L}^{-1} \cdot \begin{bmatrix} \hat{v}_1 \cdot \hat{r}_1 \\ \hat{v}_2 \cdot \hat{r}_2 \\ \hat{v}_3 \cdot \hat{r}_3 \end{bmatrix} \text{ where } \overline{L} = \begin{bmatrix} \hat{x} - x_1 & \hat{y} & \hat{z} \\ \hat{x} - x_2 & \hat{y} & \hat{z} \\ \hat{x} & \hat{y} - y_3 & \hat{z} - z_3 \end{bmatrix}$$

and similarly, it can be deduced that $\{\hat{a}_x, \hat{a}_y, \hat{a}_z\}$ is related to $\{\hat{a}_1, \hat{a}_2, \hat{a}_3\}$ as follows:

$$\begin{bmatrix} \hat{a}_x \\ \hat{a}_y \\ \hat{a}_z \end{bmatrix} = \overline{L}^{-1} \cdot \begin{bmatrix} \hat{a}_1 \cdot \hat{r}_1 \\ \hat{a}_2 \cdot \hat{r}_2 \\ \hat{a}_3 \cdot \hat{r}_3 \end{bmatrix}$$

One problem in the use of this trilateration process, however, is that it would undesirably cause the 3 outputted datasets $\{\hat{x}, \hat{y}, \hat{z}\}$, $\{\hat{v}_x, \hat{v}_y, \hat{v}_z\}$, and $\{\hat{a}_x, \hat{a}_y, \hat{a}_z\}$ to be degraded in S/N. As a solution to this problem, these 3 datasets $\{\hat{x}, \hat{y}, \hat{z}\}$, $\{\hat{v}_x, \hat{v}_y, \hat{v}_z\}$, $\{\hat{a}_x, \hat{a}_y, \hat{a}_z\}$ are rearranged into three groups: $\{\hat{x}, \hat{v}_x, \hat{a}_x\}$, $\{\hat{y}, \hat{v}_y, \hat{a}_y\}$, $\{\hat{z}, \hat{v}_z, \hat{a}_z\}$, which are then transferred to the second Gaussian-noise filter array 150 for S/N enhancement.

Second Gaussian-Noise Filter Array 150

The second Gaussian-noise filter array 150 includes an array of at least 3 Gaussian-noise filters which are preferably implemented with 3 one-stage linear Kalman filters including a first Gaussian-noise filter 151, a second Gaussian-noise filter 152, and a third Gaussian-noise filter 153. The first Gaussian-noise filter 151 is used for S/N enhancement of the x-axis oriented dataset $\{\hat{x}, \hat{v}_x, \hat{a}_x\}$ to thereby obtain a noise-reduced dataset, here represented by $\{\tilde{x}, \tilde{v}_x, \tilde{a}_x\}$; the second Gaussian-noise filter 152 is used for S/N enhancement of the y-axis oriented set of position-motion data $\{\hat{y}, \hat{v}_y, \hat{a}_y\}$ to thereby obtain a noise-reduced dataset, here represented by $\{\tilde{y}, \tilde{v}_y, \tilde{a}_y\}$; and the third Gaussian-noise filter 153 is used for S/N enhancement of the z-axis oriented set of position-motion data $\{\hat{z}, \hat{v}_z, \hat{a}_z\}$ to thereby obtain a noise-reduced dataset, here represented by $\{\tilde{z}, \tilde{v}_z, \tilde{a}_z\}$.

Radar Data Presentation Module 160

The radar data presentation module 160 is used to present the output S/N-enhanced datasets $\{\tilde{x}, \tilde{v}_x, \tilde{a}_x\}$, $\{\tilde{y}, \tilde{v}_y, \tilde{a}_y\}$, $\{\tilde{z}, \tilde{v}_z, \tilde{a}_z\}$ in a human-cognizable data format for the purpose of informing the pilot of the jetfighter 10 of the position, speed, and acceleration of the threatening AAM 20. First, the output datasets $\{\tilde{x}, \tilde{v}_x, \tilde{a}_x\}$, $\{\tilde{y}, \tilde{v}_y, \tilde{a}_y\}$, $\{\tilde{z}, \tilde{v}_z, \tilde{a}_z\}$ from the second Gaussian-noise filter array 150 are rearranged into $\{\tilde{x}, \tilde{y}, \tilde{z}\}$ for position, $\{\tilde{v}_x, \tilde{v}_y, \tilde{v}_z\}$ for velocity, and $\{\tilde{a}_x, \tilde{a}_y, \tilde{a}_z\}$ for acceleration. These datasets are then used to drive, for example, a monitor screen (not shown) for visually presenting the position, speed, and acceleration of the threatening AAM 20 to the pilot of the jetfighter 10.

Operation of the Invention

The following is a detailed description of the operation of the moving target radar tracking system of the invention 100. In this application example, it is assumed that the moving target radar tracking system of the invention 100 is installed on a jetfighter 10 and, during flight of the jetfighter 10, an AAM 20 is launched against the jetfighter 10.

During flight of the jetfighter 10, the radar signal sensor array 110 is activated to emit a beam of radar signal into the space under surveillance by the jetfighter 10. When the emitted radar signal beam hits the AAM 20, it will reflect as an echoed radar signal back to the jetfighter 10 and which is sampled by the N hybrid FSK/LFM sensors in the radar signal sensor array 120 to produce a collection of N datasets $\{r_1, v_1, a_1\}$, $\{r_2, v_2, a_2\}$, ..., and $\{r_N, v_N, a_N\}$.

Subsequently, these N datasets $\{r_1, v_1, a_1\}$, $\{r_2, v_2, a_2\}$, ..., and $\{r_N, v_N, a_N\}$ are transferred to the first Gaussian-noise filter array 130, which includes an array of N one-stage linear Kalman filters, for S/N enhancement before undergoing trilateration. The S/N-enhanced datasets $\{(\hat{r}_1, \hat{v}_1, \hat{a}_1)\}$, $\{\hat{r}_2, \hat{v}_2, \hat{a}_2\}$, ..., and $\{\hat{r}_N, \hat{v}_N, \hat{a}_N\}$ are then transferred to the trilateration module 140, which is capable of processing the N S/N-enhanced datasets $\{\hat{r}_1, \hat{v}_1, \hat{a}_1\}$, $\{\hat{r}_2, \hat{v}_2, \hat{a}_2\}$, ..., $\{\hat{r}_2, \hat{v}_2, \hat{a}_2\}$ in reference to a 3-D rectangular coordinate system to thereby obtain a collection of 3 axis-oriented sets of position-motion data respectively in reference to the x-axis, the y-axis, and the z-axis of the 3-D rectangular coordinate system. The trilateration process yields a set of position data $\{\hat{x}, \hat{y}, \hat{z}\}$, a set of velocity data $\{\hat{v}_x, \hat{v}_y, \hat{v}_z\}$, and a set of acceleration data $\{\hat{a}_x, \hat{a}_y, \hat{a}_z\}$.

Since the foregoing trilateration process might increase the level of noise in the resulted data $\{\hat{x}, \hat{y}, \hat{z}\}$, $\{\hat{v}_x, \hat{v}_y, \hat{v}_z\}$, and $\{\hat{a}_x, \hat{a}_y, \hat{a}_z\}$, these data are rearranged into three groups: $\{\hat{x}, \hat{v}_x, \hat{a}_x\}$, $\{\hat{y}, \hat{v}_y, \hat{a}_y\}$, and $\{\hat{z}, \hat{v}_z, \hat{a}_z\}$ for further processing by the second Gaussian-noise filter array 140 for S/N enhancement.

In the second Gaussian-noise filter array 150, the first Gaussian-noise filter 151 is used for S/N enhancement of the x-axis oriented dataset $\{\hat{x}, \hat{v}_x, \hat{a}_x\}$; the second Gaussian-noise filter 152 is used for S/N enhancement of the y-axis oriented dataset $\{\hat{y}, \hat{v}_y, \hat{a}_y\}$; and the third Gaussian-noise filter 153 is used for S/N enhancement of the z-axis oriented dataset $\{\hat{z}, \hat{v}_z, \hat{a}_z\}$. The resulted S/N-enhanced datasets are represented by $\{\tilde{x}, \tilde{v}_x, \tilde{a}_x\}$, $\{\tilde{y}, \tilde{v}_y, \tilde{a}_y\}$, and $\{\tilde{z}, \tilde{v}_z, \tilde{a}_z\}$, respectively.

Finally, the S/N-enhanced datasets $\{\tilde{x}, \tilde{v}_x, \tilde{a}_x\}$, $\{\tilde{y}, \tilde{v}_y, \tilde{a}_y\}$, $\{\tilde{z}, \tilde{v}_z, \tilde{a}_z\}$ are transferred to the radar data presentation module 160, which rearranges these datasets into $\{\tilde{x}, \tilde{y}, \tilde{z}\}$ for position, $\{\tilde{v}_x, \tilde{v}_y, \tilde{v}_z\}$ for velocity, and $\{\tilde{a}_x, \tilde{a}_y, \tilde{a}_z\}$ for acceleration, and then uses these position, velocity, and acceleration datasets {x̃,ỹ,z̃}, {ṽ_x,ṽ_y,ṽ_z}, {ã_x,ã_y,ã_z} to drive a radar monitor screen (not shown) for visually presenting the position, speed, and acceleration of the threatening AAM 20 to the pilot of the jetfighter 10.

In conclusion, the invention provides a method and system for radar tracking of a moving target (such as an air-to-air missile) from a moving station (such as a jetfighter) with improved accuracy and performance. The proposed method and system is characterized by the use of a hybrid FSK/LFM scheme for acquiring a collection of raw radar data, a first Gaussian-noise filter array of one-stage linear Kalman filters for S/N-enhancement of the raw radar data, a trilateration module, and a second Gaussian-noise filter array of one-stage linear Kalman filters for S/N-enhancement of the trilateration-resulted radar data. These features allow the radar tracking of moving objects to be more fast and accurate. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A moving target radar tracking method, comprising:
   emitting a radar signal beam;
   sensing an echo of the radar signal beam from a moving target and producing a raw set of radar data about the moving target, including range, velocity, and acceleration;
   performing S/N (signal-to-noise ratio) enhancement of each raw set of radar data;
   performing trilateration on the S/N-enhanced sets of radar data in reference to a predefined 3-dimensional coordinate system having a first axis, a second axis, and a third axis to obtain three axis-oriented sets of radar data respectively in reference to the first axis, the second axis, and the third axis of the 3-dimensional coordinate system;
   performing S/N enhancement on the trilateration-resulted sets of radar data; and
   presenting the S/N-enhanced trilateration-resulted sets of radar data in a human-cognizable data form.

2. The moving target radar tracking method of claim 1, wherein the sensing of the echo of radar signal is implemented with a hybrid FSK/LFM scheme.

3. The moving target radar tracking method of claim 1, wherein the S/N-enhancement of the raw sets of radar data is implemented with a Kalman filtering process.

4. The moving target radar tracking method of claim 3, wherein the Kalman filtering process is based on a one-stage linear scheme.

5. The moving target radar tracking method of claim 1, wherein the S/N-enhancement of the trilateration-resulted sets of radar data is implemented with a Kalman filtering process.

6. The moving target radar tracking method of claim 5, wherein the Kalman filtering process is based on a one-stage linear scheme.

7. A moving target radar tracking system, comprising:
   a radar signal emitter, which is capable of emitting a radar signal beam;
   a radar signal sensor array, which includes an array of radar signal sensors, each capable of sensing an echo of the radar signal beam from a moving target and producing a raw set of radar data about the moving target, including range, velocity, and acceleration;
   a first Gaussian-noise filter array, which includes an array of Gaussian-noise filters respectively coupled to the radar signal sensors in the radar signal sensor array for S/N (signal-to-noise ratio) enhancement of each raw set of radar data produced by the radar signal sensor array;
   a trilateration module for trilaterating the S/N-enhanced sets of radar data outputted from the first Gaussian-noise filter array in reference to a predefined 3-dimensional coordinate system having a first axis, a second axis, and a third axis to obtain three axis-oriented sets of radar data respectively in reference to the first axis, the second axis, and the third axis of the 3-dimensional coordinate system;
   a second Gaussian-noise filter array, which includes an array of at least three Gaussian-noise filters respectively used for S/N-enhanced of the set of first-axis oriented radar data, the set of second-axis oriented radar data, and the set of third-axis oriented radar data produced by the trilateration module; and
   a radar data presentation module, which is capable of presenting the S/N-enhanced trilateration-resulted sets of radar data produced by the second Gaussian-noise filter array in a human-cognizable data form.

8. The moving target radar tracking system of claim 7, wherein the radar signal sensor array is composed of an array of hybrid FSK/LFM sensors.

9. The moving target radar tracking system of claim 7, wherein the first Gaussian-noise filter array is composed of an array of Kalman filters.

10. The moving target radar tracking system of claim 9, wherein the Kalman filters are one-stage linear type.

11. The moving target radar tracking system of claim 7, wherein the second Gaussian-noise filter array is composed of an array of Kalman filters.

12. The moving target radar tracking system of claim 7, wherein the Kalman filters are one-stage linear type.

* * * * *